US008869102B2

(12) United States Patent
Avadhanula

(10) Patent No.: US 8,869,102 B2
(45) Date of Patent: Oct. 21, 2014

(54) CONTINUOUS TIME MODE-DRIVEN SIMULATIONS IN A GRAPHICAL MODELING ENVIRONMENT

(71) Applicant: The Mathworks, Inc., Natick, MA (US)

(72) Inventor: Srinath Avadhanula, Wappingers Falls, NY (US)

(73) Assignee: The MathWorks, Inc., Natick, MA (US)

( * ) Notice: Subject to any disclaimer, the term of this patent is extended or adjusted under 35 U.S.C. 154(b) by 79 days.

(21) Appl. No.: 13/755,716

(22) Filed: Jan. 31, 2013

(65) Prior Publication Data

US 2013/0145345 A1    Jun. 6, 2013

Related U.S. Application Data

(63) Continuation of application No. 12/170,888, filed on Jul. 10, 2008, now Pat. No. 8,387,000.

(60) Provisional application No. 60/949,367, filed on Jul. 12, 2007, provisional application No. 61/073,929, filed on Jun. 19, 2008.

(51) Int. Cl.
    *G06F 9/44*    (2006.01)

(52) U.S. Cl.
    CPC ........................................ *G06F 8/20* (2013.01)
    USPC .......................................................... 717/105

(58) Field of Classification Search
    CPC ........................................................ G06F 8/34
    USPC .......................................................... 717/105
    See application file for complete search history.

(56) References Cited

U.S. PATENT DOCUMENTS

| 7,020,850 | B2 * | 3/2006 | Raghavan et al. ............... 703/23 |
| 7,581,089 | B1 * | 8/2009 | White ........................... 712/242 |
| 2006/0064680 | A1 * | 3/2006 | Devane ......................... 717/140 |
| 2007/0129925 | A1 * | 6/2007 | Otsuki et al. .................... 703/14 |
| 2008/0184215 | A1 * | 7/2008 | Baev et al. ..................... 717/155 |
| 2008/0282246 | A1 * | 11/2008 | Dolev et al. ................... 718/102 |
| 2009/0044171 | A1 | 2/2009 | Avadhanula |
| 2013/0145345 | A1 * | 6/2013 | Avadhanula ................. 717/105 |

OTHER PUBLICATIONS

Remelhe, "Simulation and Visualization Support for User-Defined Formalisms Using Meta-Modeling and Hierarchical Formalism Transformation," Proceedings of the 2001 IEEE International Conference and Control Applications, Oct. 1, 2001, 6 pages.
Ferreira et al., "Modelling Hybrid Systems Using Statecharts and Modelica," May 13, 2004, 7 pages.
The MathWorks, Inc., "Using Simulink—Zero Crossings," Jul. 9, 2007, 2 pages.

* cited by examiner

*Primary Examiner* — Don Wong
*Assistant Examiner* — Theodore Hebert
(74) *Attorney, Agent, or Firm* — Harrity & Harrity, LLP

(57) ABSTRACT

A system, computer-readable medium, and method includes providing a control flow graph including at least one condition. An update control flow graph is automatically generated based on the provided control flow graph, where execution of the update control flow graph includes an evaluation of the condition. The update control flow graph and a value corresponding to the evaluated condition is stored. An output control flow graph based on the provided control flow graph is automatically generated, where execution of the output control flow graph is based on the stored value corresponding to the evaluated condition. A mode transition control flow graph configured to identify mode transitions for the control flow graph at one or more time intervals is automatically generated and the update control flow graph is re-executed based on the generated mode transition control flow graph.

20 Claims, 14 Drawing Sheets

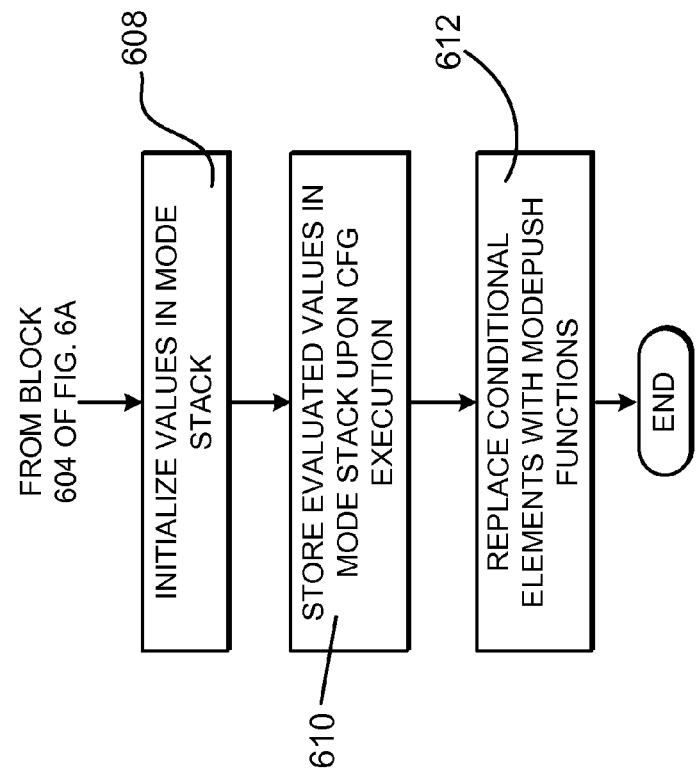
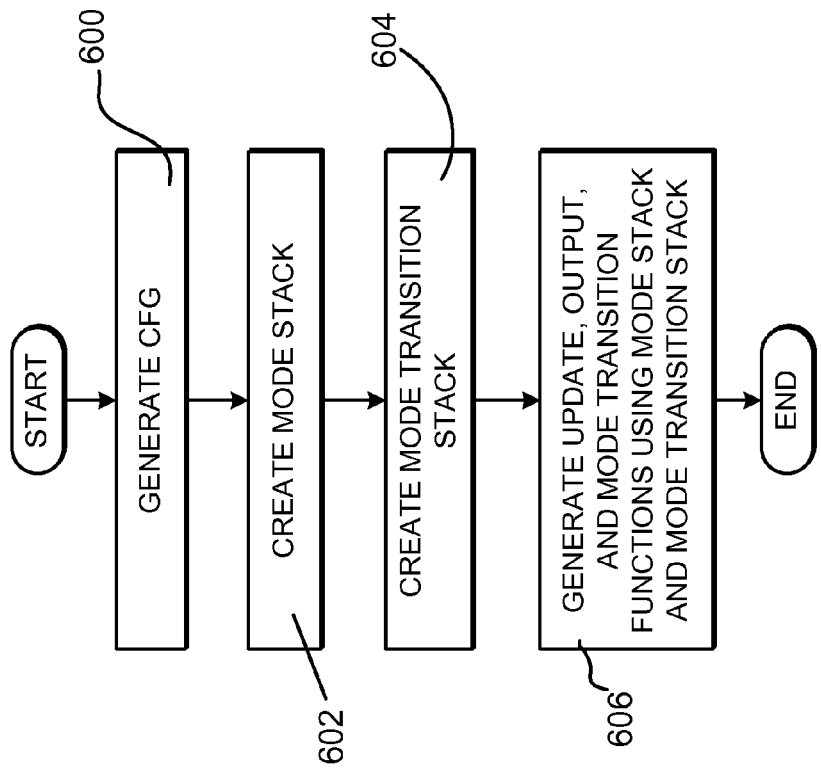

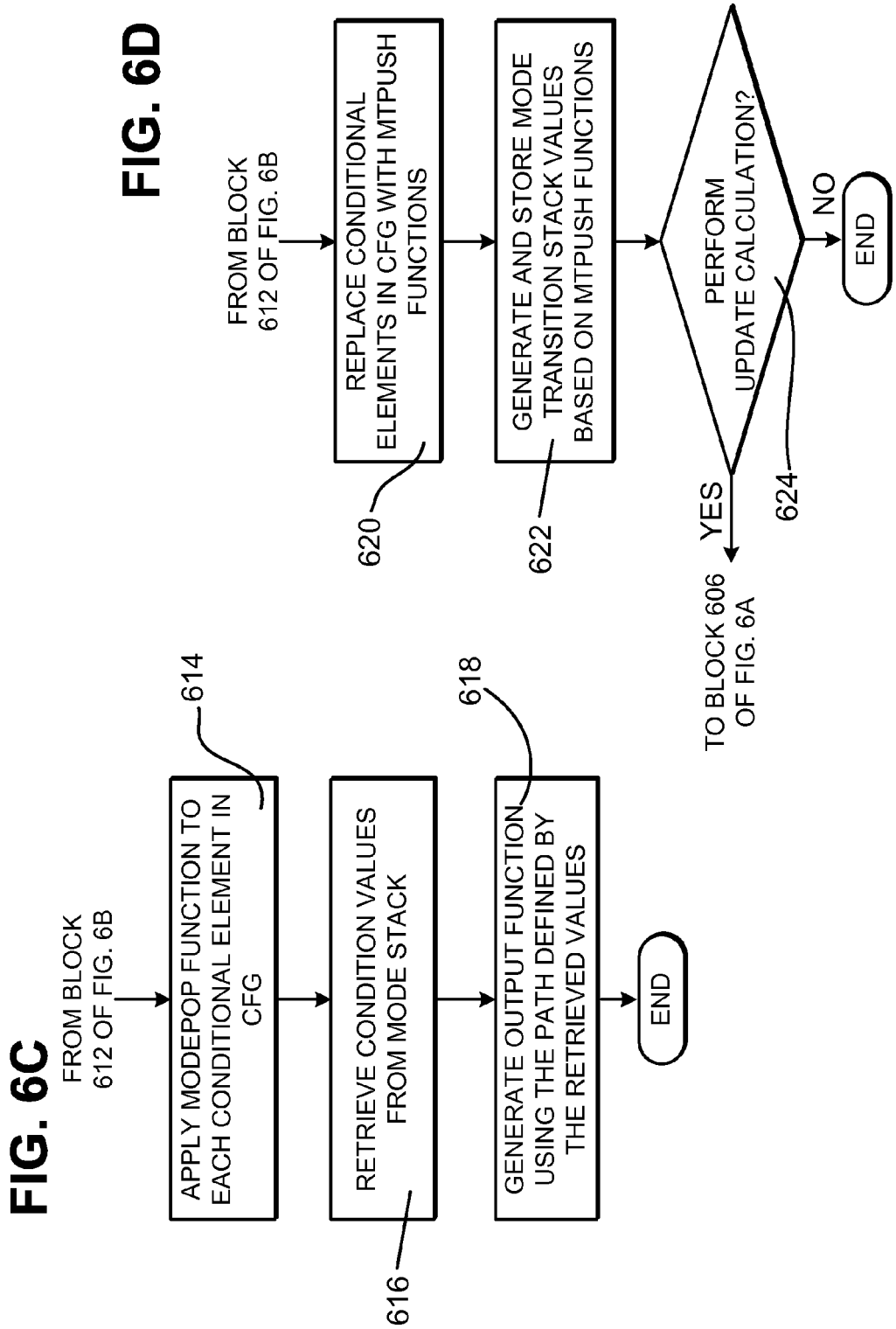

CONTINUOUS TIME MODE-DRIVEN SIMULATIONS IN A GRAPHICAL MODELING ENVIRONMENT

CROSS-REFERENCE TO RELATED APPLICATIONS

This application is a continuation of U.S. patent application Ser. No. 12/170,888, filed Jul. 10, 2008, which claims priority to U.S. Provisional Patent Application 60/949,367, filed on Jul. 12, 2007, and U.S. Provisional Patent Application 61/073,929, filed on Jun. 19, 2008. These disclosures are incorporated herein by reference.

BACKGROUND

Technical computing environments present a user, such as a scientist or engineer, with an environment that enables efficient analysis and generation of technical applications. In some technical computing environments, for example, users may perform advanced analyses, visualize data, and develop algorithms. Ideally, a technical computing environment enables a technical researcher or designer to efficiently and quickly perform tasks such as research, product development, software and system development, etc.

Existing technical computing environments may be implemented as or run in conjunction with a graphically-based environment. For example, in one existing graphically-based technical computing environment, models may be built by connecting graphical blocks, where each block may represent an object associated with functionality and/or data. Blocks may be hierarchical in the sense that each block itself may be implemented as one or more blocks. A user may, for instance, view the model at a high level, then select blocks to drill down into the model to see increasing levels of model detail.

In addition to block diagram-based modeling environments, technical computing environments may include state diagramming environments that provide design tools for modeling and simulating event or mode driven systems and subsystems. Such state diagramming environments may be used to represent finite state machines that include states and transitions between states.

A state diagramming environment may receive inputs from a block diagram-based modeling environment. The state diagramming environment may perform state-based processing based on the received inputs and may make outputs available to the block diagram-based modeling environment. Unfortunately, conventional state diagramming environments support only systems that include well-formed control flow and do not support state-based modeling of systems that include arbitrary or ill-condition control flow and continuous time systems.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIGS. 6A-6D are flow diagrams illustrating exemplary processing for generating update, output, and mode transition functions consistent with aspects described herein;

DETAILED DESCRIPTION

The following detailed description refers to the accompanying drawings. The same reference numbers in different drawings may identify the same or similar elements. Also, the following detailed description does not limit the invention.

Overview

Implementations described herein relate to a modeling environment or computational system design environment in which users may construct and execute graphic and mode or state driven models. In the manner described below, state diagram models defining continuous time state-based systems may be used to accurately and efficiently model mode changes and continuous states. Additional details regarding an exemplary modeling environment for use with embodiments described herein are set forth in U.S. Provisional Patent Application No. 61/073,929, filed on Jun. 19, 2008, the entirety of which is incorporated by reference herein.

Exemplary System Description

Figure 1:
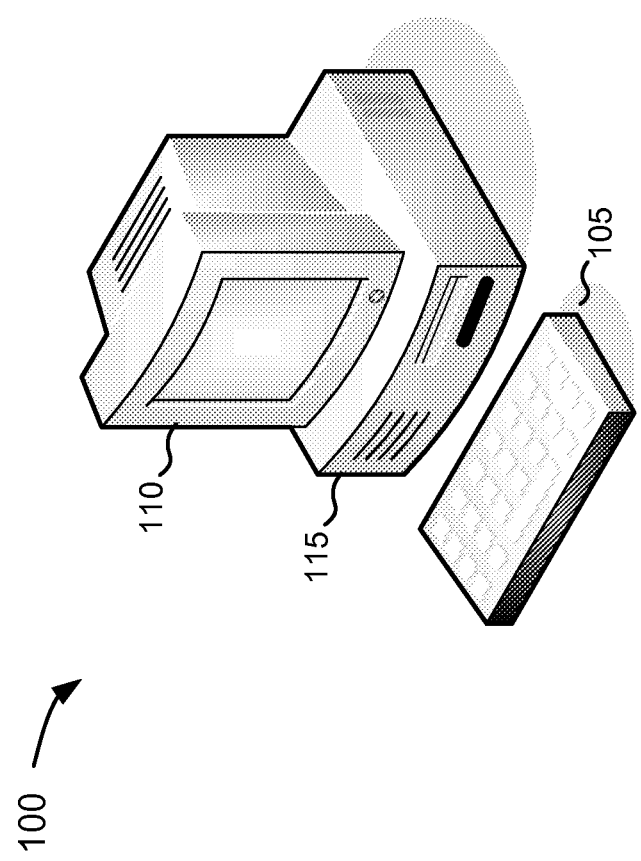
FIG. 1 is an exemplary diagram of a workstation in which concepts described herein may be implemented.

FIG. 1 is an exemplary diagram of a system in which concepts described herein may be implemented. The system may include a personal computer or workstation 100. Workstation 100 may include, for example, a keyboard 105, a display or monitor 110, and a casing or housing 115. Workstation 100 may execute a modeling environment that presents a user with an interface that enables efficient analysis and generation of technical applications. For example, the modeling environment may provide a numerical and/or symbolic computing environment that allows for matrix manipulation, plotting of functions and data, implementation of algorithms, creation of user interfaces, and/or interfacing with programs in other languages.

Although workstation 100 is shown as a single detached computer, it can be appreciated that the modeling environment may be run by multiple networked computing devices. In such an implementation, the modeling environment may be executed in a distributed manner, such as by executing on multiple computing devices simultaneously. Additionally, in some implementations, the modeling environment may be executed over a network, such as the Internet, in a client-server relationship. For example, workstation 100 may act as a client that communicates with, using a web browser, a server that stores and potentially executes the modeling environment program.

In one exemplary implementation, modeling environment may be provided as a web service to workstation 100. The web service may provide workstation 100 with access to one or more programs (e.g., the modeling environment) provided by a program provider. A web service can include any software application that allows machine-to-machine communications over a network (e.g., a local area network (LAN), a metropolitan area network (MAN), a wide area network (WAN), such as the Internet, etc.). For example, a web service may communicate with a client (e.g., workstation 100) using an application program interface (API) that the client may access over the network. The web service may exchange Hypertext Markup Language (HTML), Extensible Markup Language (XML), or other types of messages with the client using industry compatible standards (e.g., simple object access protocol (SOAP)) and/or proprietary standards. A web service may further include network services that can be described using industry standard specifications, such as web service definition language (WSDL) and/or proprietary specifications.

Figure 2:
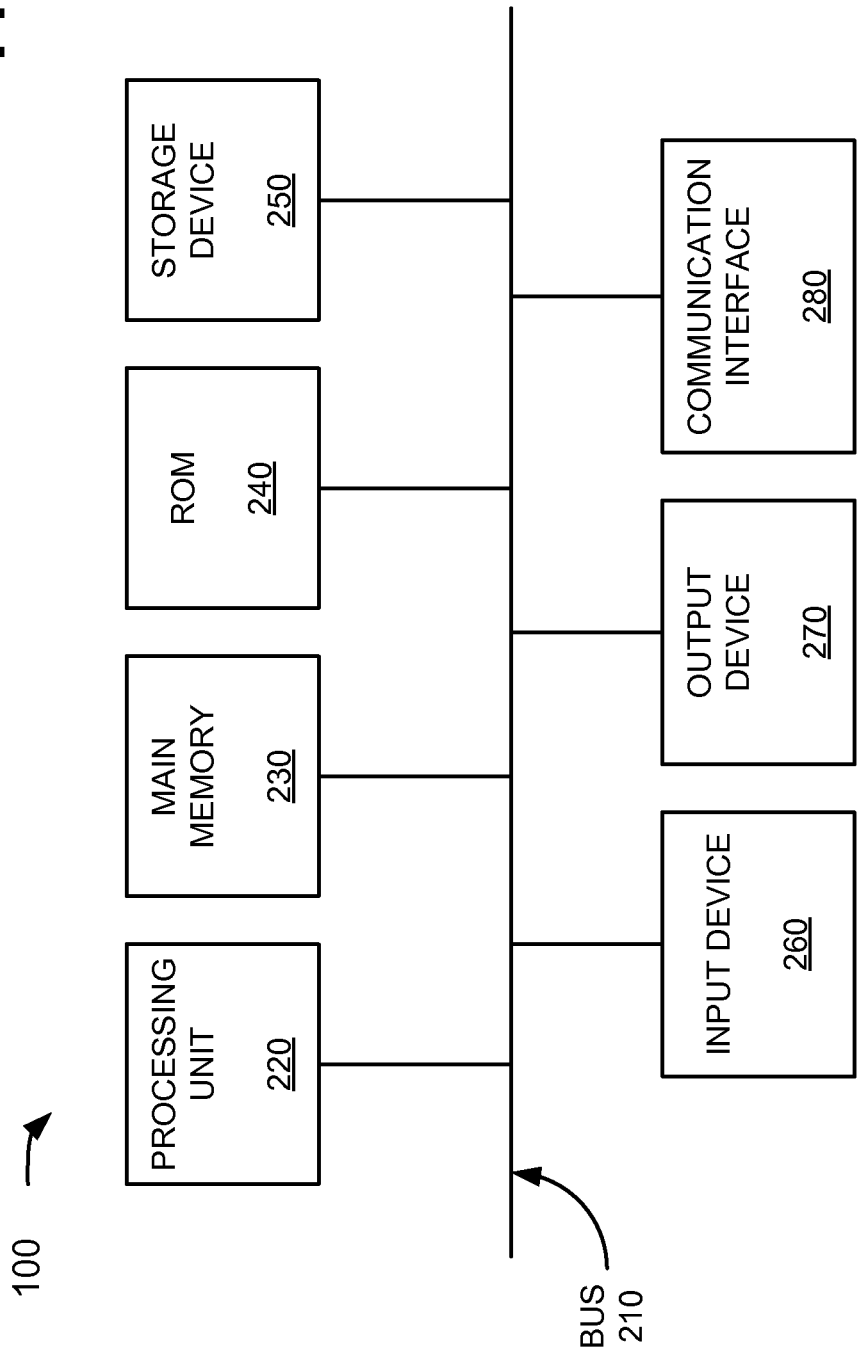
FIG. 2 is a diagram of an exemplary device corresponding to the workstation of FIG. 1.

FIG. 2 is a diagram of an exemplary device corresponding to workstation 100. As illustrated, workstation 100 may include a bus 210, a processing unit 220, a main memory 230, a read-only memory (ROM) 240, a storage device 250, an input device 260, an output device 270, and/or a communication interface 280. Bus 210 may include a path that permits communication among the components of workstation 100.

Processing unit 220 may include a processor, microprocessor, or other types of processing logic that may interpret and execute instructions. Processing unit 220 may include general purpose processing devices and/or other types of processing devices, such as but not limited to, reduced instruction set processors, field programmable gate arrays (FPGAs), application specific integrated circuits (ASICs), etc. Processing unit 220 may also include processing devices that use a single core and/or that use multiple cores.

Main memory 230 may include a random access memory (RAM) or another type of dynamic storage device (such as, DRAM, SRAM, EDO RAM, etc.) that may store information and instructions for execution by processing unit 220. ROM 240 may include a ROM device or another type of static storage device that may store static information and/or instructions for use by processing unit 220. Storage device 250 may include a magnetic and/or optical recording medium and its corresponding drive.

Input device 260 may include a mechanism that permits an operator to input information to workstation 100, such as a keyboard, a mouse, a multi-point input mechanism such as a touchpad or touchscreen, a pen, a microphone, voice recognition and/or biometric mechanisms, etc. Output device 270 may include a mechanism that outputs information to the operator, including a display, a printer, a speaker, etc. Communication interface 280 may include any transceiver-like mechanism that enables workstation 100 to communicate with other devices and/or systems. For example, communication interface 280 may include mechanisms for communicating with another device or system via a network.

As will be described in detail below, workstation 100 may perform certain operations described herein in response to processing unit 220 executing software instructions contained in a computer-readable medium, such as main memory 230. A computer-readable medium may be defined as a physical or logical memory device. The software instructions may be read into main memory 230 from another computer-readable medium, such as storage device 250, or from another device via communication interface 280. The software instructions contained in main memory 230 may cause processing unit 220 to perform processes that will be described later. Alternatively, hardwired circuitry may be used in place of or in combination with software instructions to implement processes described herein. Thus, implementations described herein are not limited to any specific combination of hardware circuitry and software.

The computer-readable medium may particularly include a graphical modeling application that provides a variety of mathematical functions and/or graphical tools.

Although FIG. 2 shows exemplary components of workstation 100, in other implementations, workstation 100 may contain fewer, different, or additional components than depicted in FIG. 2. In still other implementations, one or more components of workstation 100 may perform one or more tasks performed by one or more other components of workstation 100.

Exemplary Technical Computing Environment

Figure 3:
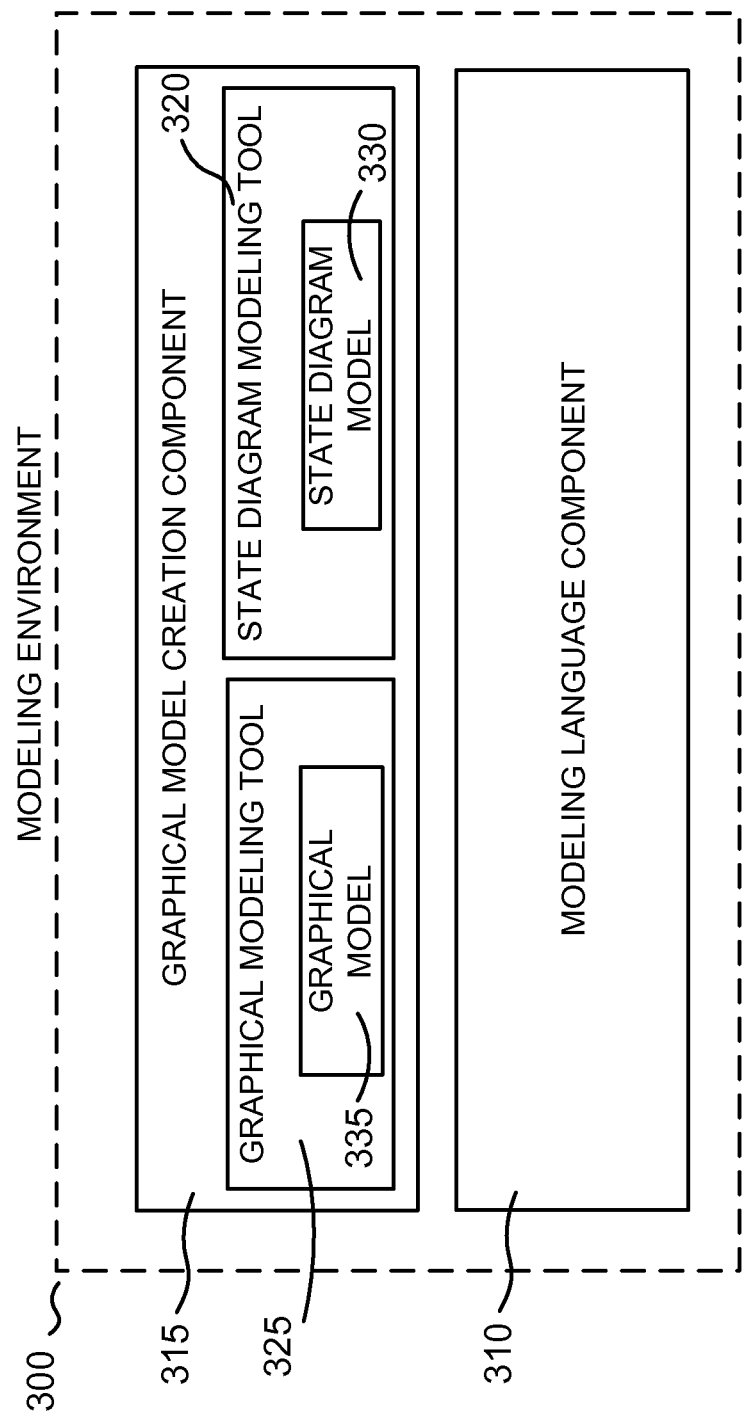
FIG. 3 is a diagram illustrating functional components of a technical computing environment (TCE)

FIG. 3 is a diagram illustrating functional components of a modeling environment 300. As mentioned, a modeling environment may include a program stored on a computer-readable medium, such as main memory 230 or ROM 240 in workstation 100. In other implementations, modeling environment 300 may be associated with another device separate from workstation 100, and may accessed by workstation 100 via communication interface 280 and a network. In yet other implementations, all or part of modeling environment 300 may be implemented in hardware.

Modeling environment 300 may include a modeling language component 310 and a graphical model creation component 315. Modeling language component 310 may generally function to implement a programming language. Modeling language component 310 may provide code that can be used to implement components, such as blocks and/or lines, used in a graphical model created using graphical model creation component 315.

Graphical model creation component 315 may include software for modeling, simulating, and/or analyzing dynamic systems. Graphical model creation component 315 may, for instance, support linear and nonlinear systems, models in continuous time, discrete time, or a hybrid of the two. Systems modeled with graphical model creation component 315 may be constructed using a graphical interface that allows the user to arrange blocks that represent functionality and/or data. Graphical model creation component 315 may additionally allow users to execute or run the created model and to view and analyze results of the model.

In general, graphical model creation component 315 may be used to graphically generate designs that simulate the behavior of the system or device being designed or modeled. The models may be used to facilitate communication, peer-review, and iterative refinement with visual representations that simplify understanding. Graphical model creation component 315 may include specialized blocks that can define error or fault conditions and that can be used to identify design flaws.

As shown in FIG. 3, graphical model creation component 315 may include a state diagram modeling tool 320 and a graphical modeling tool 325. State diagram modeling tool 320 may provide an environment for the design, development, testing, simulation, and/or execution of a state diagram model 330. Graphical modeling tool 325 may provide an environment for the design, development, testing, simulation, and/or execution of a graphical model 335, such as a block diagram model. Graphical modeling tool 325 may also provide for incorporating or referencing state diagram model 330 via graphical model 335. State diagram modeling tool 320 may communicate with graphical modeling tool 325 via any suitable type and form of interface.

State diagram modeling tool 320 may provide a development environment for creating any type and/or form of state diagram model 330, which may also be referred to as a state machine diagram model, a state diagram, a state chart, or a chart. In one exemplary implementation, and by way of example, state diagram modeling tool 320 may include Stateflow® by The MathWorks, Inc. of Natick, Mass. In the exemplary embodiment of Stateflow®, state diagram models may be referred to as Stateflow charts. Stateflow® may integrate with graphical modeling tool 325, such as Simulink® by The MathWorks, Inc. of Natick, Mass., to model, simulate, and/or analyze systems. In one embodiment, Stateflow® may provide for the design and development of deterministic, supervisory control systems in a graphical environment. State diagram modeling tool 320 may provide for state machine representation, flow diagram notations, and/or state-transition diagrams all in the same state diagram model. In another implementation, state charts consistent with aspects described herein may be automatically generated from other diagrams that may model another view on a system, such as UML diagrams.

In one exemplary implementation, state diagram model 330 may include a graphical representation of a state machine, such as either a finite state machine or a nondeterministic state machine, where states and transitions between states form the design elements of a system. A state machine may include a representation of an event or mode driven system where the system makes a transition from one state to another state provided any conditions associated with the transition are met. A state may be a mode of behavior that can be either active or inactive based on inputs, outputs, transitions, and/or conditions. A transition may link one state to another state and may have a condition, such as any logic, computation, algorithm, and/or executable instruction, used to determine if and when a transition between states may occur.

In one implementation consistent with aspects described herein, state diagram model 330 may include a truth table, graphical or otherwise, used to represent relationships between inputs, outputs, states, transitions, conditions of a finite state machine, Petri nets, state transition matrices, and/or abstract state machines. Although generally discussed herein as graphical state diagram model 330, any type of graphical state model may be used and any type of state machine, such as a finite, nondeterministic, and/or a virtual state machine may be used in embodiments described herein. Additionally, state diagram modeling tool 320 and state diagram model 330 may use any type and/or form of notation for state machine representation, such as any notation known by those ordinarily skilled in the art, or any notation suitable for practicing the operations of the present invention. It should be understood that state machine notation need not be of a graphical type.

State diagram modeling tool 320 may provide elements such as states, junctions, and functions, such as graphical functions of Simulink® software and/or Stateflow® software, that may be placed and arranged graphically in a window, design area or otherwise collectively in a state diagram model. States and junctions may be connected together in the state diagram model 330 to form flows and transitions for an implementation of a state machine.

State diagram modeling tool 320 may provide for parallelism in that two or more orthogonal states may be active at a same time. Additionally, state diagram modeling tool 320 may provide a mechanism for specifying transitions and/or conditions based on historical information related to execution of a state diagram model. Additionally, state diagram modeling tool 320 may use any type and/or form of graphical element to visually represent elements, such as for state machine representation, in state machine diagram model 330.

Furthermore, state diagram modeling tool 320 may provide for organizing, incorporating, and/or referring sub-charts, hierarchically or otherwise, into state diagram model 330. For example, a first state diagram model representing a portion of an overall state machine design may be incorporated into or referenced by a top level state diagram model. Each state diagram model may be organized hierarchically into any number and/or levels of state diagram models to represent a finite state machine.

Although state diagram modeling tool 320 is generally discussed in view of Stateflow®, various forms and types of state diagram modeling tools may be used in practicing the operations of the present invention as described herein. In some embodiments, state diagram modeling tool 320 may comprise any type and/or form of a Petri net modeling and simulation tool. Corresponding state diagram models may comprise a visual formalism or graphical model representing a Petri net model or system or an abstract state machine.

A Petri net may include a graphical and mathematical modeling tool that provides a mathematical expression of discrete distributed systems and may be expressed in terms of places, transitions, and/or arcs that connect them. Petri nets may be used to describe and model systems that may be characterized as being concurrent, asynchronous, distributed, parallel, nondeterministic, and/or stochastic. Additionally, tokens or tickets may be used in Petri nets to simulate the activities of systems (e.g., dynamic and/or concurrent activities of systems). Accordingly, state diagram model 330 may include any type and/or form of constructs and elements representing a Petri net model, such as a place, a transition, an arc, a token, and/or a ticket.

In some embodiments, state diagram modeling tool 320 may include any type and/or form of dynamic system modeling and simulation tool, such as any, discrete event, discrete time, continuous time, or hybrid (e.g., incorporating both discrete event and continuous time semantics) simulation system. For example, state diagram modeling tool 320 may include any of the event modeling and simulation tools manufactured by Imagine That, Inc. of San Jose, Calif., Simul8 Corporation of Boston, Mass., or XJ Technologies Company of St. Petersburg, Russia. Accordingly, state diagram model 330 may include a visual formalism or graphical model representing a continuous, discrete, or event modeling system. State diagram model 330 may represent system behavior that can be expressed in terms of what a system does in correspondence to an event or a certain number of event types. The states may be explicit or implicitly modeled. For example, an event-based modeling environment such as the SimEvents application from the MathWorks, Inc. of Natick, Mass., may use model constructs or elements representing queues and/or servers. A queue element may represent a queue of entities, the arrival and departure of which occur in response to events. A server element may represent an entity server that processes entities from the queue where events determine the server processing of its entities, for example, arrival of a new entity, suspension of processing, completion of processing, pre-emption of processing, etc.

Additionally, in some embodiments, state diagram modeling tool 320 may be able to execute the state diagram model. For example, in the exemplary embodiment of Stateflow®, state diagram modeling tool 320 may include a graphical execution and debugging environment that provides a user control of the simulation of a corresponding state diagram model, and access to debug related tasks, such as setting breakpoints. Additionally, state diagram modeling tool 320 may display information about the state machine or model 330, such as active and inactive states during execution or other information as requested or desired by the user.

As described above, in some embodiments, state diagram modeling tool 320 may be included in, connected to, integrated with, or is otherwise associated with a graphical modeling tool 325. In an exemplary embodiment, graphical modeling tool 325 may include the Simulink® graphical modeling environment from the MathWorks, Inc. of Natick, Mass. In graphical modeling tool 325, configurable and customizable functional blocks may be used to create block diagram models (such as graphical model 335) that may represent a design, or algorithm, for a control system, a signal processing system, a communication system, any other time-varying or dynamic system or any computational hardware device. In other embodiments, state diagram modeling tool 320 may be separate from graphical modeling tool 325 but otherwise interfaced or in communication with graphical modeling tool 325.

In one implementation, graphical modeling tool 325 may include any type and/or form of graphical model 335. Graphical modeling tool 325 may provide any type of tools, libraries, and/or configuration mechanisms to graphically create and/or edit graphical model 335. In an exemplary embodiment, graphical model 335 may include a block diagram model provided by the Simulink® environment of The MathWorks, Inc. In this example, the block diagram model may include a series of different type of blocks arranged in a desired manner and connected via connection lines to represent signal values traversing the blocks. Graphical model 335 may include any type of element to form a graphical or non-graphical model, such as connectors, blocks, or any other graphical or non-graphical form and representation of functionality supported by graphical modeling tool 325.

In one embodiment, graphical model 335 may incorporate, reference, or otherwise use a state diagram model created by or available within state diagram modeling tool 320. In an exemplary embodiment, Stateflow® may be integrated and used with Simulink® software to provide an environment combining state diagram modeling of Stateflow® software with the graphical modeling of Simulink®. In this embodiment, graphical model 335 may include any elements provided by graphical modeling tool 325, such as any elements of a block diagram model known by those ordinarily skilled in the art, and may also include state diagram model 330, or any portion thereof, that may be provided by state diagram modeling tool 320. For example, graphical model 335 may include a block diagram model having blocks connected as inputs and/or outputs of a state diagram model 330.

In one embodiment consistent with aspects described herein, graphical modeling tool 325 may facilitate simulation or execution of graphical model 335. For example, in the exemplary embodiment of Simulink® software, graphical modeling tool 325 may include an environment that provides for the execution and debugging of graphical model 335. Additionally, in other embodiments, graphical modeling tool 325 may generate code of executable instructions representing a graphical model to compile and build for executing on a target hardware platform and/or operating system. As such, graphical model 335 and/or state diagram model 330 may be processed into an executable form to simulate, run, or otherwise execute the design, functionality, and/or operations represented by graphical model 335 available within graphical modeling tool 325 and/or state diagram model 330 available within state diagram modeling tool 320. An executable form of graphical model 335 and/or state diagram model 330 may be any type and/or form of representation of a graphical model and/or a state diagram model that may be executed, and may comprise any graphical and/or textual forms, interpreted languages or scripts, programming languages, and/or any combination thereof. In some embodiments, the executable form of the graphical model and/or state diagram model may include any type of interpreted language, such as the M language. In other embodiments, the executable form of the graphical model and/or state diagram model may include any type of executable instructions, such as scripts, libraries, or compiled executables.

In one implementation consistent with aspects described herein, state diagram modeling tool 320 and graphical modeling tool 325 and any portion thereof, may include an application, module, service, computer program, software component, library, or any other type and/or form of executable instruction which is designed to and capable of executing the functionality of the present invention as described herein. Additionally, state diagram modeling tool 320 and graphical modeling tool 325 may be configured to be and capable of running any of the modules, libraries or software components of the MATLAB® and/or Simulink® product families. As such, technical computing environment 300 may include all or a portion of the software components of MATLAB® and/or Simulink® installed on the workstation 100, or alternatively, accessible from another computing device on a network.

Exemplary Continuous Time Simulations

As described briefly above, in one implementation consistent with aspects described herein, state diagram modeling tool 320 may be configured to support mode driven or continuous time simulations executed by graphical modeling tool 325. Using existing state diagram modeling tools, execution of state diagram model 330 at discrete time intervals may result in significant inaccuracies surrounding mode or state changes. That is, state diagram model 330 called or executed at traditionally discrete time intervals may fail to return a result to graphical modeling tool 325 that is accurately indicative of a mode or state transition. Consequently, subsequent processing of the simulation based on these results may also be inaccurate. Conversely, an accurate result may be returned to graphical model 335 upon execution of state diagram model 330 using significantly reduced sample times. However, such a methodology may result in significantly increased simulation time.

Figure 4:
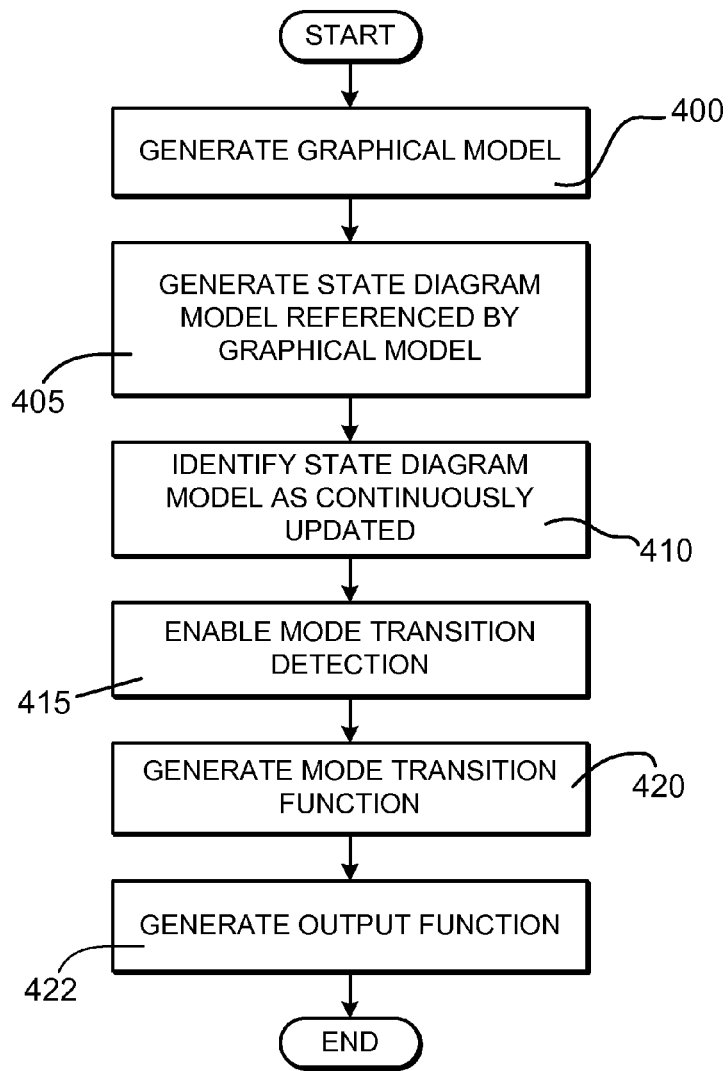
FIG. 4 is a flow diagram illustrating exemplary processing performed by the graphical modeling tool of FIG. 3 for facilitating recognition and handling of state diagram mode transitions within continuous time simulation models.

FIG. 4 is a flow diagram illustrating exemplary processing for facilitating recognition and handling of state diagram mode transitions within continuous time simulation models. Processing may begin upon generation or provision of a graphical model within a graphical modeling tool (block 400). State diagram model 330 may be created and referenced by the graphical model (block 405). As described above, graphical model 335 and state diagram model 330 may be formed within technical computing environment 300 and may include any suitable collection of graphical and non-graphical elements, blocks, signals, functions, operations, etc.

During or subsequent to creation of the state diagram model, the state diagram model may be identified as a continuously updated model (block 410). Results obtained from continuously updated models may be subject to interpolation between sample periods, resulting in more accurate results. In one implementation, such identification may be made at the time of state diagram model creation, such as via a selectable parameter or menu option. Next, mode transition detection may be enabled for the state diagram model (block 415). As with the identification of the continuously updated model, mode transition detection may be performed via a selectable parameter or menu option.

In one exemplary implementation, creation of state diagram model 330 may include definition and use of various local variables whose values may be based on received inputs to the state diagram model. Once designated as a continuously updated model in block 410, one or more of the defined variables may also be designated as continuously updated. In other implementations, individual portions or sections of state diagram model 330 may be selectively indicated to be evaluated for locating mode transitions.

Next, occurrences of likely or possible mode or state changes in the state diagram model may be identified by generating a mode transition function, an update function, and an output function associated with state diagram model 330 (block 420). Additional details regarding the generation and calculation of these functions are set forth in additional detail in relation to FIGS. 6A-10. State diagram model 330 may include a number of states or modes and a number of transitions between the various states or modes.

As discussed above, the mode transition function associated with graphical model 335 or a portion of graphical model 335 may be called by graphical modeling tool 325 to enable the accurate determination of the time at which a state change or mode change occurred. In one implementation consistent with aspects described herein, the mode transition function as well as corresponding update and output functions may be simultaneously and automatically generated (block 422) based on a control flow graph (CFG) representation of graphical model 335 or one or more portions of graphical model 335. One exemplary general state machine is depicted in FIG. 5.

Figure 5:
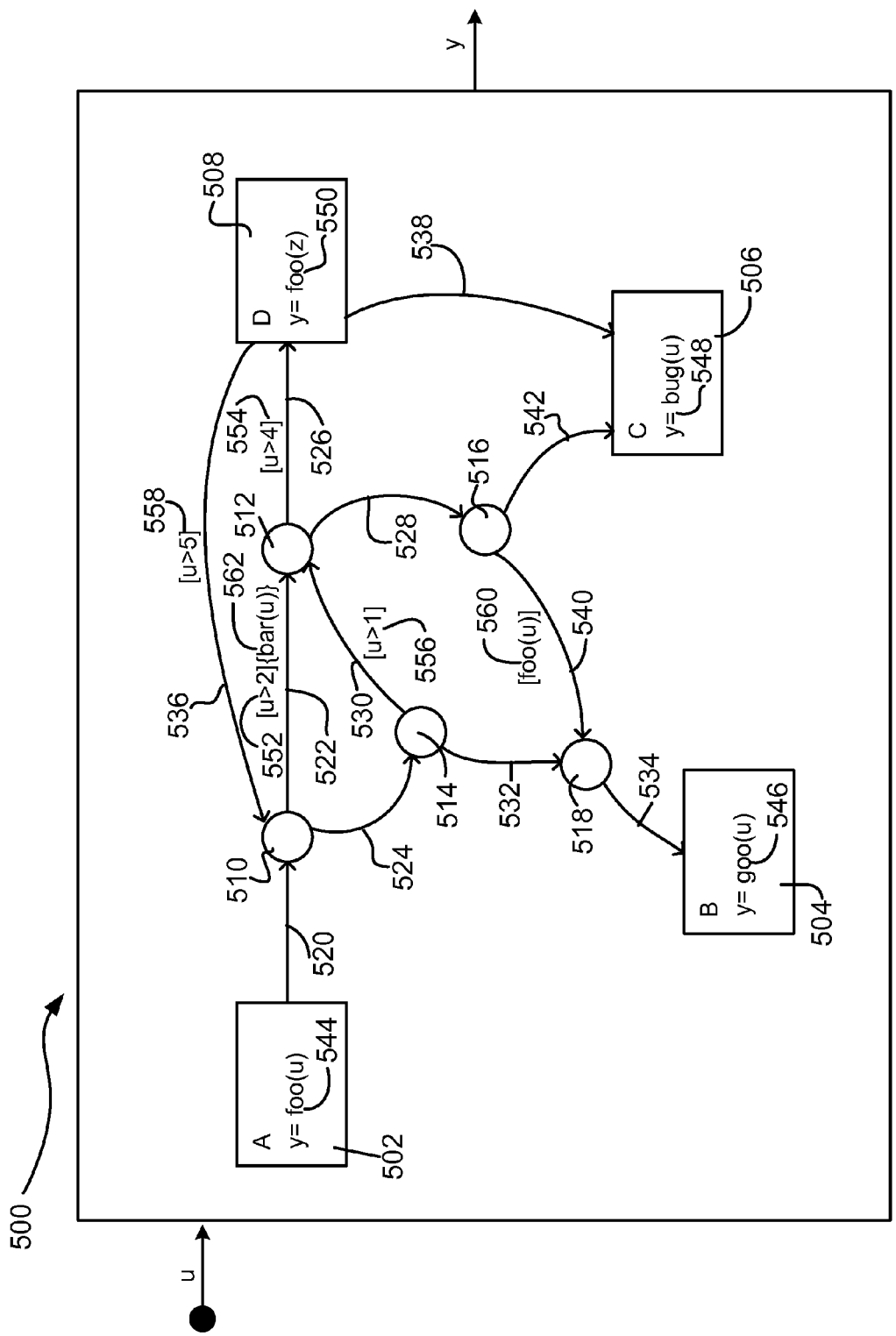
FIG. 5 is an exemplary block diagram illustrating an exemplary general state diagram according to aspects described herein.

FIG. 5 is a block diagram illustrating an exemplary general state diagram 500 having element 502 corresponding to state A, element 504 corresponding to state B, element 506 corresponding to state C, and element 508 corresponding to state D. State diagram 500 also includes a number of junctions 510, 512, 514, 516, and 518 positioned between states 502-508. Each junction 510-518 may have one or more entry or exit paths and may serve as jumping points between various transitions, each transition possibly having a different condition associated therewith. Transitions 520, 522, 524, 526, 530, 532, 534, 536, 540, and 542 may be provided for connecting states 502-508 and junctions 510-518 to each other. Evaluation of transitions may be performed in a user-defined order or based on a default order of operations. As illustrated in this example, state elements 502-508 may include function calls or other entry, during, or exit actions. Additionally, transitions 520-542 may include condition statements which dictate a path through state diagram 500 upon execution of the state diagram.

As shown in FIG. 5, element 502 corresponding to state A may include a function call y=foo(u) 544 designating a function to be called and executed while the state diagram is in state A. Similarly, state element 504 may include function call y-goo(u) 546, state element 506 may include function call y=bug(u) 548, and state element 508 may include function call y=foo(z) 550. In the manner described in detail below, mode transitions associated with state elements 502-508 may be identified by generating control flow graphs corresponding to function calls 544-550.

State element 502 may be connected to junction 510 by transition 520. Junction 510 may include two possible exit transitions 522 and 524. Transition 522 may include condition statement [u>2] 552 associated therewith, as well as a corresponding condition action {bar(u)} 562 taken when condition statement 552 is satisfied. In the event that condition statement 552 is satisfied, the system proceeds to junction 512 having two exit transitions 526 and 528. Transition 526 includes condition statement [u>4] 554, the satisfaction of which results in the system passing to element 508 corresponding to state D. Transition 528 does not include a condition and results in the system proceeding to junction 516, described below.

Returning to junction 510, if condition statement 552 does not evaluate to true, transition 524 is taken to junction 514. At junction 514 two possible exit transitions 530 and 532 are possible. Transition 530 includes condition statement [u>1] 556, the satisfaction of which results in the system passing to junction 512 described above. Transition 532 does not include a condition statement and results in the system passing to junction 518. Junction 518 includes only one exit transition 534 leading to state element 504 corresponding to state B. State B includes function call 546 as described above.

While in state element 508 corresponding to state D, described above, function call 550 is made. State element 508 may include two exit transitions 536 and 538. The order in which these transitions are taken may be based on a user-defined ordering system or on a default (e.g., clock-wise or counter-clock-wise) ordering system. Transition 536 includes condition statement 558, and if evaluated to true, passes the system back to junction 510 described above. If condition statement 558 does not evaluate to true, transition 538 is taken, passing the system to state element 506 corresponding to state C. While in state C, function call 548 is made.

Returning to junction 512, when condition statement 554 does not evaluate to true, transition 528 is taken, passing the system to junction 516. Junction 516 includes two exit transitions 540 and 542. Transition 540 includes condition statement [foo(u)] 560. When condition statement 560 is satisfied, the system passes to junction 518 described above. When condition statement 560 is not satisfied, transition 542 is taken, passing the system to state element 506 corresponding to state C, described above.

Elements 502-508, junctions 510-518, transitions 520-542, function calls 544-550, condition statements 552-560, and condition action 562 may be configurable using, for example, state diagram modeling tool 320. In the manner described below, mode transitions corresponding to various portions of state diagram 500 may be identified by generating a series of control flow graphs or CFGs.

Consistent with implementations described herein, the CFGs capable of being handled in the described manner include a variety of arbitrary or ill-conditioned CFGs, such as CFGs including unstructured control flow (e.g., including more than properly nested if-else statements); loops; temporary variables used in the computation of an output from an input; CFGs having non-SSA (static single assignment) form (that is, each variable in the model may be written to multiple times in any given "execution" of the CFG); function-calls where one function can call another; and recursive elements, such as functions or call-graphs.

FIG. 6A is a flow diagram illustrating exemplary processing for generating an update function associated with a graphical model, an output function associated with a graphical model, and a mode transition function associated with a graphical mode for use with continuous time simulation models. Processing may begin upon generation or provision of a control flow graph associated with a graphical model within a graphical modeling tool (block 600). In one implementation consistent with aspects described herein, the control flow graph may be automatically generated upon creation or execution of the graphical model or state diagram (e.g., state diagram 500). In other implementations, the control flow graph may be user-defined or created in parallel to or prior to creation of the graphical model. In yet other embodiments, a model or state diagram may be configured to include predefined rules governing the generation of the CFGs in the described manner. For example, the presence of certain constraints or existence of certain criteria on a state machine description may trigger a simpler mode preserving and mode transition function. Such constraints may include the absence of relational operations involving continuously varying variables in the state actions, or the absence of writes to variables anywhere except in transition actions. In models or diagrams meeting these criteria, mode transition identification in the manner described below may be restricted or eliminated to increase processing efficiency during execution of the model or diagram.

As described above, a control flow graph represents all aspects of control flow through a state diagram, where different paths through conditional nodes or elements in the state diagram correspond to different states in the state diagram. In reference to aspects described above, mode transitions in the model may correspond to path changes in the CFG. Identifying when these path changes are likely to happen is the purpose of the mode transition function described above.

Returning to FIG. 6A, once the initial or original CFG has been generated for the graphical mode, a mode stack having entries corresponding to conditions in the CFG may be created and stored in memory (block 602). In one implementation based on the CFG, each mode stack entry may include a Boolean (e.g., T or F) entry indicating a path through a conditional node in the CFG. For example, if, upon model execution, a conditional element evaluates to true, a "T" value may be inserted into a corresponding position in the mode stack. A mode transition stack also having entries corresponding to conditions in the CFG may be created and stored in memory (block 604). In contrast to the mode stack, the mode transition stack may include values corresponding to a likelihood of whether a mode transition will occur at a given time. As described above, an integer value of −1 may indicate that a mode transition has not occurred; while an integer value of +1 may indicate that a mode transition has occurred.

Once the mode stack and the mode transitions stack are created, the update function, output function, and mode transition function corresponding to the graphical model may be automatically generated (block 606). In one implementation, these functions may be generated by executing a series of functions on each stack including the modePush, modePop, and mtPush functions. Details regarding the generation of the above functions are described in detail below.

FIG. 6B is a flow diagram illustrating exemplary processing for generating the update function associated with the graphical model. Processing may begin following block 604 of FIG. 6A, where the mode transition stack is created and stored in memory. Values stored in the mode stack and the mode transitions may be initialized upon a first execution of the CFG (block 608). For example, the graphical model may be executed and conditional elements of the model may be evaluated based on the various input and algorithmic elements associated with the model. The modePush function may operate on the CFG to store the Boolean values associated with each evaluated conditional element into a corresponding location in the mode stack (block 610). The update function may be generated by replacing the conditional elements in the CFG with modePush functions, resulting in population of the mode stack with conditional decisions corresponding to the CFG for a current time (block 612). Once populated, those values may be used in determining outputs for the CFG.

FIG. 6C is a flow diagram illustrating exemplary processing for generating the output function associated with the graphical model. Processing may begin following block 612 of FIG. 6B, where the update function has been executed to populate the values in the mode stack. The modePop function may be applied to each conditional element of the CFG (block 614). The Boolean values associated with each evaluated conditional element may be retrieved from their corresponding locations in the mode stack (block 616). Using the retrieved values, the output function may be generated using a path through the CFG that is identical to that determined during the last update determination (block 618).

FIG. 6D is a flow diagram illustrating exemplary processing for generating the mode transition function associated with the graphical model. Processing may begin following block 612 of FIG. 6B, where the update function has been executed to populate the values in the mode stack. The mode transition function may be generated by replacing the conditional elements in the CFG with mtPush functions, resulting in population of the mode stack with conditional decisions corresponding to the CFG for a current time (block 620). The mode transition values (e.g., −1 or +1) associated with each conditional element along the path through the CFG identified during the last update calculation may be generated and stored at corresponding locations in the mode transition stack (block 622). Once populated, those values may be used in determining whether another update calculation should be performed (block 624). When it is determined that a value in the mode transition stack has changed to a +1, processing may return to block 606 for execution of another update calculation, and corresponding population of the mode stack.

In one example, the application of the modePush, modePop, and mtPush functions may be represented as:

```
bool modeStack[1000];
int mtStack[1000];
int currentPtr = 0;
void initStack( )
{
    currentPtr = 0;
}
bool modePush(bool i)
{
    modeStack[currentPtr] = i;
    currentPtr ++;
    return i;
}
bool modePop(bool i)
{
    bool retval = modeStack[currentPtr];
    currentPtr --;
    return retval;
}
bool mtPush(bool i)
{
```

```
        bool retval = modeStack[currentPtr];
        if (i != retval) {
            mtStack[currentPtr] = 1;
        }
        else {
            mtStack[currentPtr] = -1;
        }
        currentPtr ++;
        return retval;
    }
```

The above described embodiment provides an efficient mechanism for generating update, output, and mode transition functions based on a control flow graph corresponding to a graphical model or state diagram. By using a mode stack to store mode identifications during update operations, subsequent in-state output operations may be easily and accurately made. Additionally, by using a mode transition stack to maintain information regarding when mode transitions are likely, update operations may be efficiently triggered at appropriate times, for continuous time simulation models.

Figure 7B:
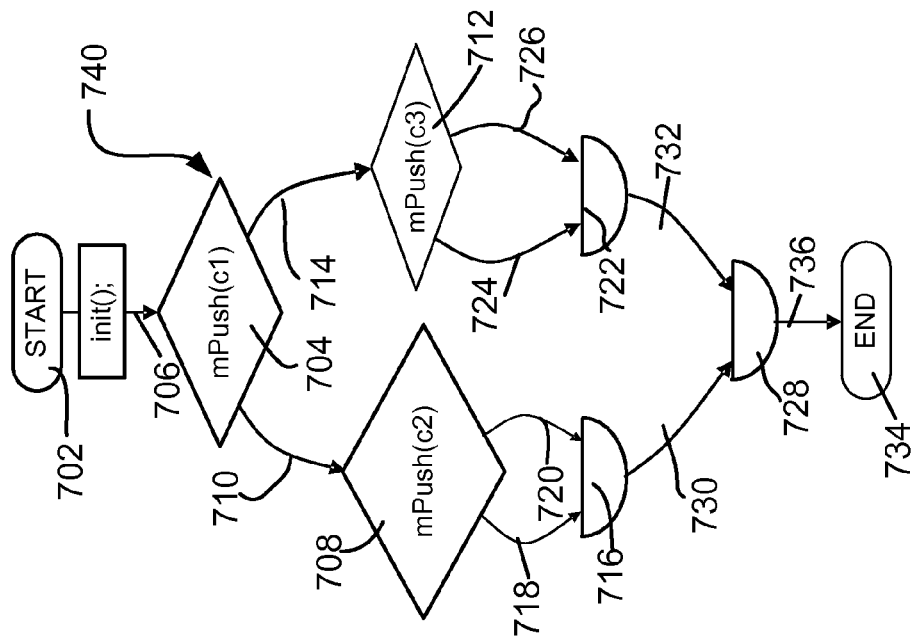
FIGS. 7A-7D are control flow graphs representing the update, output, and mode transition functions of FIGS. 6A-6D.
Figure 7A:
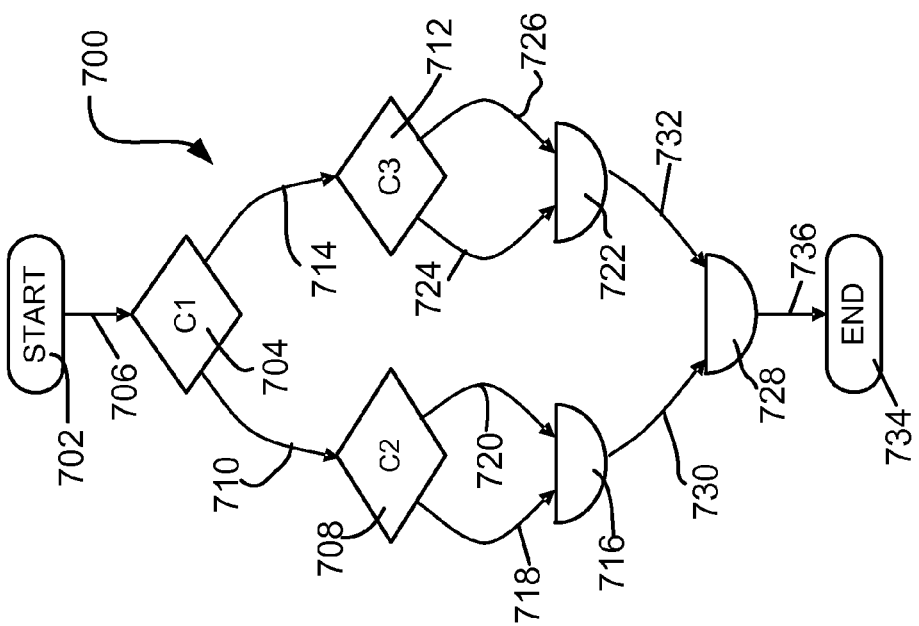

FIG. 7A is an exemplary CFG 700 representing a general state diagram or model (e.g., model 335). As shown, CFG 700 may include a number of nodes that represent algorithmic aspects of model 335 and edges that indicate a flow between nodes. More particularly, CFG 700 may begin with a start node 702, and may proceed to a conditional node 704 via edge 706. Conditional node 704 may provide an evaluation of a condition or "IF" statement C1. If the condition evaluates to false, flow may proceed to conditional node 708 along edge 710. However, if the condition evaluates to true, flow may proceed to conditional node 712 along edge 714.

Conditional node 708 may provide an evaluation of a condition or "IF" statement C2, while conditional node 712 may provide an evaluation of a condition or "IF" statement C3. Regardless of the evaluation of condition C2, flow may pass to merge node 716 along either of edges 718 or 720. Similarly, regardless of the evaluation of condition C3, flow may pass to merge node 722 along either of edges 724 or 726. Flow from merge nodes 716 and 722 may then pass to merge node 728 along edges 730 and 732. Flow then passes to end node 734 via edge 736.

FIG. 7B is an exemplary update CFG 740 corresponding to the update function described above. In CFG 740, the Boolean values corresponding to conditions or "IF" statements C1-C3 present in CFG 700 may be "pushed" to a mode stack in the manner described in detail above by replacing the conditional nodes with corresponding modePush functions. For example, if, upon execution of model 325 at a first time T, condition C1 evaluates to true, flow continues to condition C3 along edge 714 where a determination regarding condition C3 would be made. If condition C3 evaluates to false, flow would continue to merge node 722 along edge 724. In this implementation, the mode stack vector would read (T, T, F), where true is the default value for each condition in the stack.

Figure 7D:
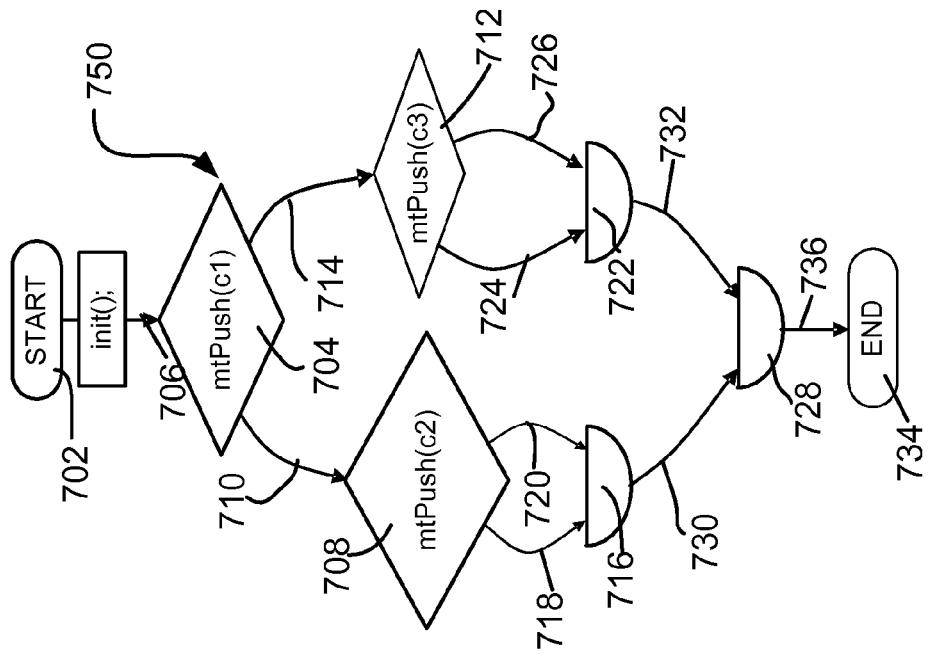
Figure 7C:
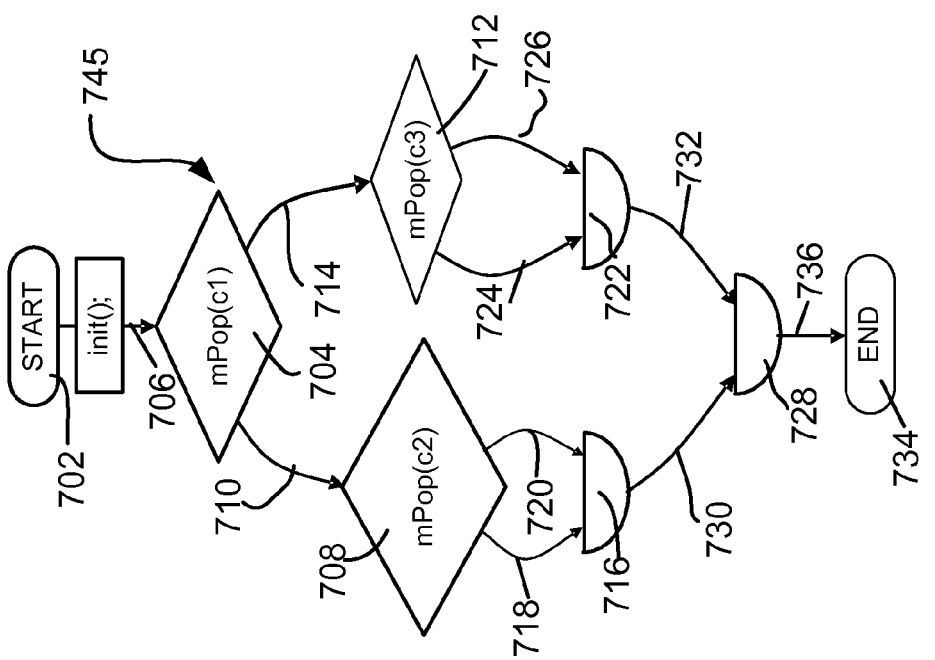

FIG. 7C is an exemplary output CFG 745 corresponding to the output function described above. In CFG 745, the path through CFG 745 is retrieved from the mode stack by replacing the conditional nodes with corresponding modePop functions. As described above, the modePop function retrieves the conditional values from the mode stack and sets the path through the CFG based on the retrieved values. Once the path is retrieved, an output corresponding to the retrieved path may be calculated. Using the example described above, a mode stack vector of (T, T, F) would be used to generate an output and no additional conditional evaluation would take place until another update calculation is performed.

FIG. 7D is an exemplary mode transition CFG 750 corresponding to the mode transition function described above. In CFG 750, the path through CFG 745 is retrieved from the mode stack and mode transition values for each conditional element are identified by replacing the conditional nodes with corresponding mtPush functions. As described above, the mtPush function determines a likelihood of a mode transition at any conditional element along the path through the CFG identified in the prior update calculation. The mode transition values are then pushed to the mode transition stack for use in determining whether an additional update calculation is necessary (e.g., whether a mode transition is likely). For example, a mode transition stack vector of (−1, −1, +1) may indicate that a mode transition at conditional element C3 is likely and that an update calculation may be necessary.

Figure 8B:
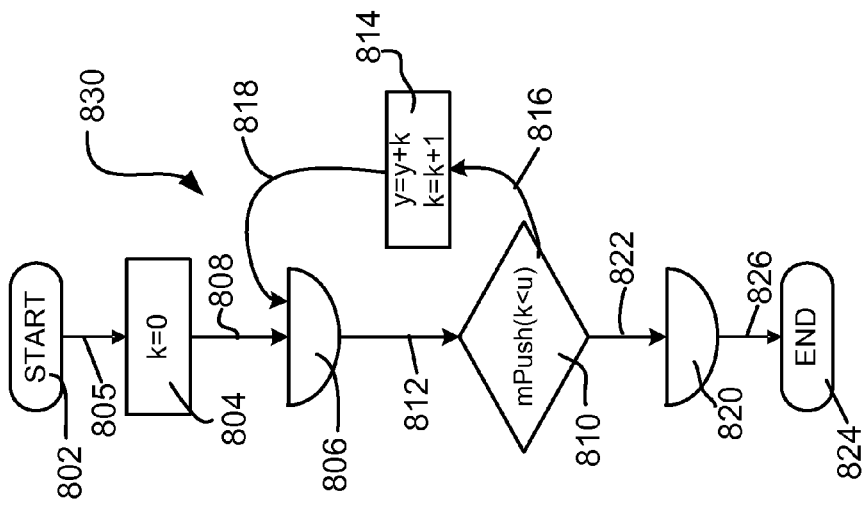
FIGS. 8A-8D are control flow graphs representing the update, output, and mode transition functions corresponding to an ill-conditioned state diagram or model corresponding to a system including a loop.
Figure 8A:
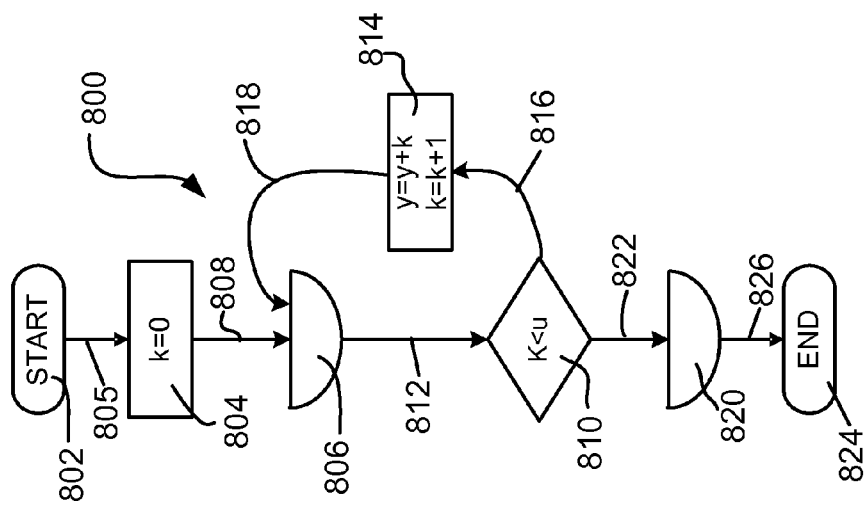

FIG. 8A is an exemplary CFG 800 representing an ill-conditioned state diagram or model corresponding to a system including a loop. In this example, CFG 800 corresponds to a simple summing algorithm that adds together the integers less than u. As shown, CFG 800 may include a number of nodes that represent algorithmic aspects of the state diagram or model and edges that indicate a flow between nodes. More particularly, CFG 800 may begin with a start node 802, and may proceed to a variable initialization node 804 via edge 805 in which a temporary variable k is initialized to 0. As a temporary variable, k is not received as an input to CFG 800. Flow may proceed from initialization node 804 to merge node 806 via edge 808 and on to conditional node 810 via edge 812.

Conditional node 810 may provide an evaluation of a condition or "IF" statement k<u. If the condition evaluates to true, flow may proceed to condition action node 814 along edge 816. In condition action node 814, the value of k is incremented by one and a value of summing variable y (an input variable to CFG 800) is incremented by the value of k. Flow then passes back to merge node 806 via edge 818. If the condition of conditional node 810 evaluates to false (i.e., that k is greater than or equal to u), flow may proceed to conditional end node 820 along edge 822. Flow then passes to end node 824 via edge 826.

CFG 800 is ill-conditioned in that a value of a temporary variable (i.e., k) may change multiple times during execution of the CFG. As a result, a single examination of the CFG to determine a mode transition would fail in some instances to accurately identify such a transition.

FIG. 8B is an exemplary update CFG 830 corresponding to the update function described above. In CFG 830, the Boolean values corresponding to conditions or "IF" statements k<u present in CFG 800 may be "pushed" to a mode stack in the manner described in detail above by replacing the conditional nodes with corresponding modePush functions. For example, if, upon execution of the corresponding state diagram at a first time T, condition k<u evaluates to true, flow continues to condition action node 814 along edge 816 where temporary variable k is incremented and added to the summing variable y. In this implementation, the mode stack vector would read (T), where true is the evaluated value associated with for condition k<u.

Figure 8D:
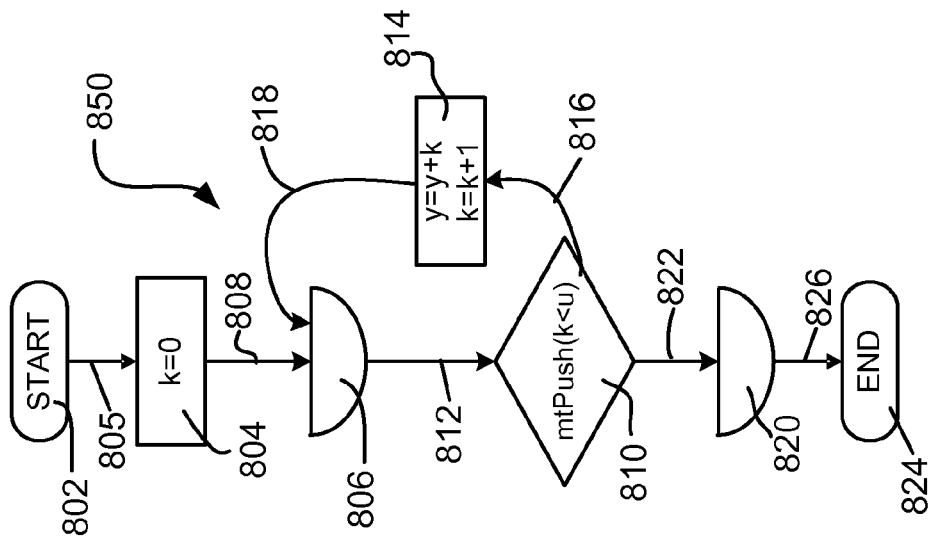
Figure 8C:
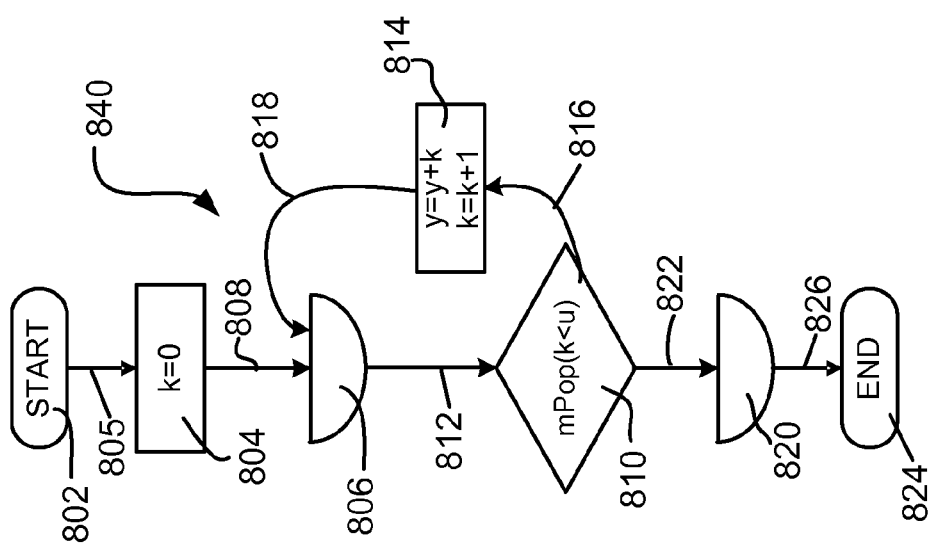

FIG. 8C is an exemplary output CFG 840 corresponding to the output function described above. In CFG 840, the path through CFG 800 is retrieved from the mode stack by replacing conditional node 810 with a corresponding modePop function. As described above, the modePop function retrieves the conditional value set in the mode stack and sets the path through the CFG based on the retrieved values. Once the path is retrieved, an output corresponding to the retrieved path may be calculated. Using the example described above, a mode stack vector of (T) would be used to generate an output and no additional conditional evaluation would take place until another update calculation is performed.

FIG. 8D is an exemplary output CFG 850 corresponding to the mode transition function described above. In CFG 850, the path through CFG 800 is retrieved from the mode stack and mode transition values for each conditional element are identified by replacing conditional node 810 with a corresponding mtPush function. As described above, the mtPush function identifies a mode transition at any conditional element along the path through the CFG identified in the prior update calculation. The mode transition values are then pushed to the mode transition stack for use in determining whether an additional update calculation is necessary (e.g., whether a mode transition is likely). For example, a mode transition stack vector of (−1) may indicate that a mode transition at conditional element k<u is not true and that an additional update calculation is not necessary.

Figure 9A:
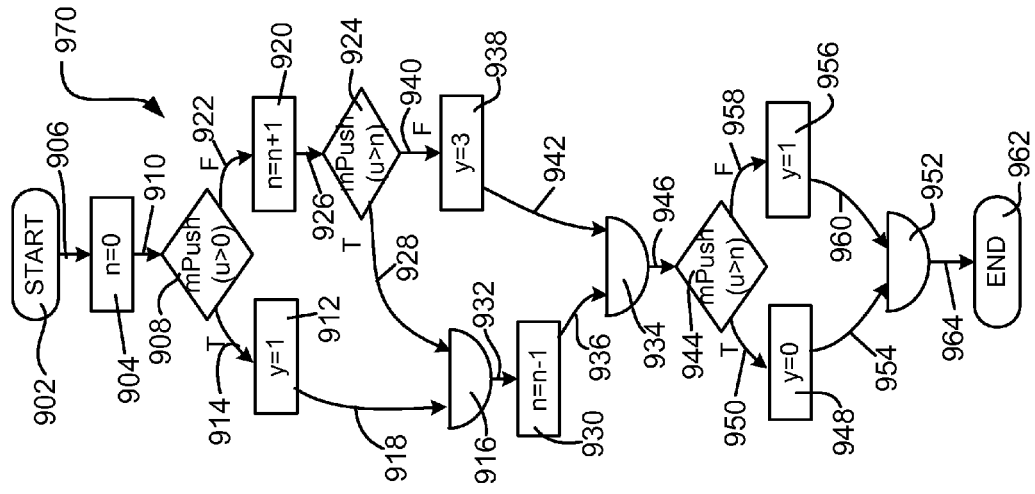
FIGS. 9A-9D are control flow graphs representing the update, output, and mode transition functions corresponding to an ill-conditioned state diagram or model corresponding to a system configured in non-SSA form.

FIG. 9A is an exemplary CFG 900 representing another ill-conditioned state diagram or model corresponding to a system configured in non-SSA form. As shown, CFG 900 may include a number of nodes that represent algorithmic aspects of the state diagram or model and edges that indicate a flow between nodes. CFG 900 may begin with a start node 902, and may proceed to a variable initialization node 904 via edge 906 in which a temporary variable n is initialized to 0. As a temporary variable, n is not received as an input to CFG 900. Flow may proceed from initialization node 904 to conditional node 908 via edge 910. Conditional node 908 may provide an evaluation of a condition or "IF" statement u>0. If the condition u>0 evaluates to true, flow may proceed to transition action node 912 along edge 914. In transition action node 912, the value of y is set to 1. Flow then passes to merge node 916 via edge 918. If the condition of conditional node 908 evaluates to false (i.e., that u is not greater than 0), flow may proceed to transition action node 920 along edge 922. In transition action node 920, the value of n is incremented by 1 (e.g., n=n+1). Flow then passes to conditional node 924 via edge 926.

Conditional node 924 may provide an evaluation of a condition statement u>n. If the condition u>n evaluates to true, flow may proceed to merge node 916 along edge 928. From merge node 916, flow passes to transition action node 930 via edge 932. In transition action node 930, the value of n is decremented by 1 (e.g., n=n−1). Flow then passes to merge node 934 via edge 936.

Returning to conditional node 924, if the condition of conditional node 924 evaluates to false (i.e., that u is not greater than n), flow may proceed to transition action node 938 along edge 940. In transition action node 938, the value of y is set to 3. Flow then passes to merge node 934 via edge 942.

From merge node 934, flow passes to conditional node 944 along edge 946. Conditional node 944 may provide an evaluation of a condition statement u>n. If the condition u>n evaluates to true, flow may proceed to transition action node 948 along edge 950. In transition action node 948, the value of y is set to 0. Flow then passes to merge node 952 via edge 954.

If the condition u>n evaluates to false, flow may proceed to transition action node 956 along edge 958. In transition action node 956, the value of y is set to 1. Flow then passes to merge node 952 via edge 960. Flow then passes to end node 962 via edge 964.

CFG 900 is considered an ill-conditioned CFG in that evaluation of conditional node 944 changes based on the path taken through the CFG. As a result, a single examination of the CFG to determine a mode transition would fail in some instances to accurately identify such a transition.

Figure 9B:
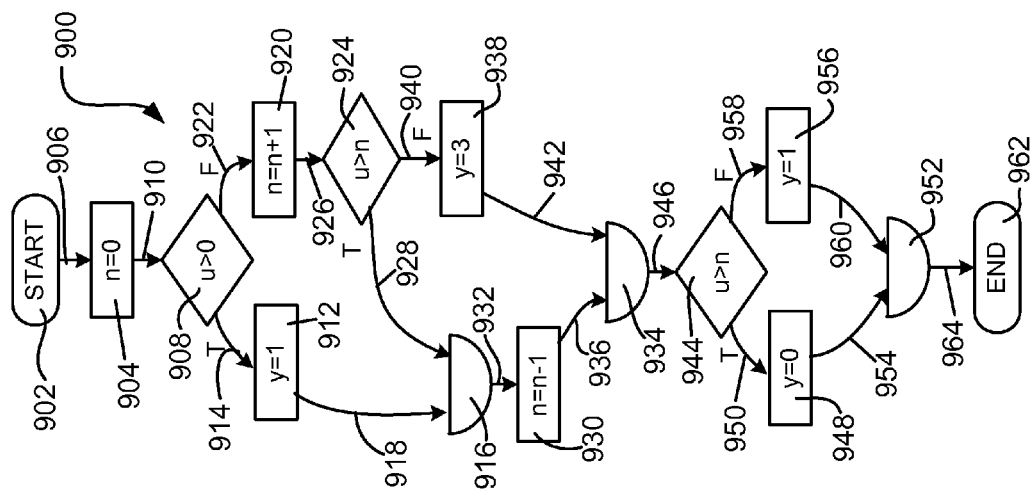

FIG. 9B is an exemplary update CFG 970 corresponding to the update function described above. In CFG 970, the Boolean values corresponding to conditional nodes 908, 924, and 944 present in CFG 900 may be "pushed" to a mode stack in the manner described in detail above by replacing the conditional nodes with corresponding modePush functions. For example, if, upon execution of the corresponding state diagram at a first time T, condition u>0 corresponding to conditional node 908 evaluates to true, conditional node 924 is not executed and conditional node 944 may evaluate to false. In this implementation, the mode stack vector would read (T, T, F), where true is the default condition of conditional node 924. Alternatively, if condition u>0 corresponding to conditional node 908 evaluates to false, conditional node 924 evaluates to false, conditional node 944 evaluates to true, the mode stack vector would read (F, F, T)

Figure 9D:
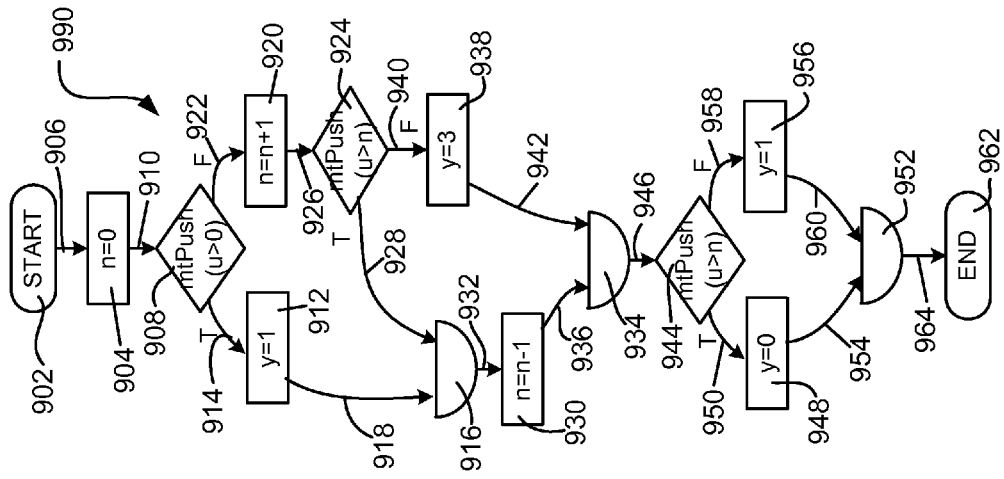
Figure 9C:
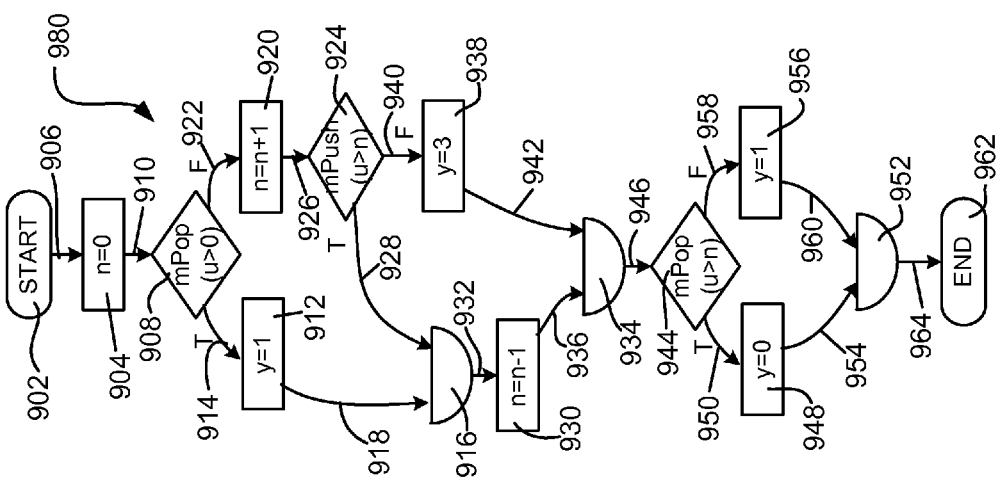

FIG. 9C is an exemplary output CFG 980 corresponding to the output function described above. In CFG 980, the path through CFG 900 is retrieved from the mode stack by replacing conditional nodes 908, 924, and 944 with a corresponding modePop function. As described above, the modePop function retrieves the conditional values set in the mode stack and sets the path through the CFG based on the retrieved values. Once the path is retrieved, an output corresponding to the retrieved path may be calculated. Using the second example described above, a mode stack vector of (F, F, T) would be used to generate an output and no additional conditional evaluation would take place until another update calculation is performed.

FIG. 9D is an exemplary output CFG 990 corresponding to the mode transition function described above. In CFG 990, the path through CFG 900 is retrieved from the mode stack and mode transition values for each conditional element are identified by replacing conditional nodes 908, 924, and 944 with a corresponding mtPush function. As described above, the mtPush function identifies a mode transition at any conditional element along the path through the CFG identified in the prior update calculation. The mode transition values are then pushed to the mode transition stack for use in determining whether an additional update calculation is necessary (e.g., whether a mode transition is likely). For example, a mode transition stack vector of (−1, −1, +1) may indicate that a mode transition at conditional node 944 is likely to occur and that an additional update calculation is necessary.

Absolute Time Dynamics

In addition to accurately identifying discontinuous mode or state transitions during continuous time simulations, aspects consistent with embodiments described herein may provide for absolute time dynamics within continuous time state diagram models, such as model 330. It should be understood that the phrase "absolute time" refers to time passage during the simulation and not the current or real-world time. FIG. 10A is a block diagram illustrating an exemplary state diagram 1000 having graphical element 1005 corresponding to state A and graphical element 1010 corresponding to state B. Elements 1005 and 1010 may be connected by a transition 1015 having a condition statement [after(2.33, sec)] 1020. Elements 1005 and 1010, transition 1015, and condition statement 1020 may be configurable using, for example, state diagram modeling tool 320. As described above, state diagram graphical elements 1005 and 1010 may be configured to include actions (not shown) taken upon entry, exit, or during their respective states.

Consistent with aspects described herein, condition statement 1020 may include the absolute time condition key word "after," "sec" or any other defined key word such as "min," "hour," "day," etc, In the example of FIG. 10A, the condition statement provides a transition from state A (element 1005) to state B (element 1010) after 2.33 seconds have passed. In conventional, non-continuous time state diagram models, such an absolute time element would be both unnecessary and difficult to implement, given that states are typically only evaluated in variable steps when needed, potentially resulting in missed time intervals, etc.

Figure 10B:
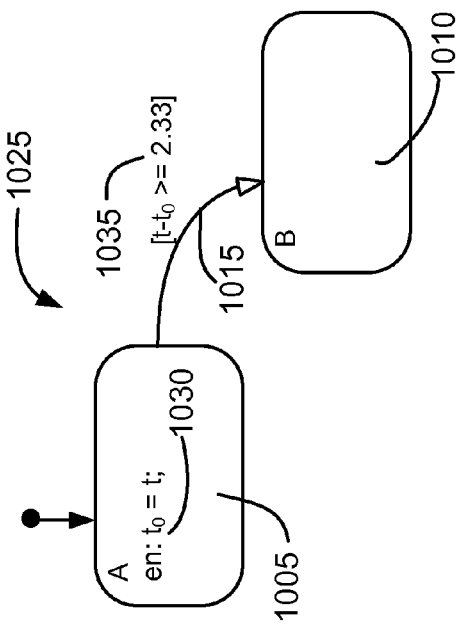
FIGS. 10A and 10B are block diagrams illustrating conversion from an absolute time state diagram to a non-absolute time state diagram consistent with aspects described herein.
Figure 10A:
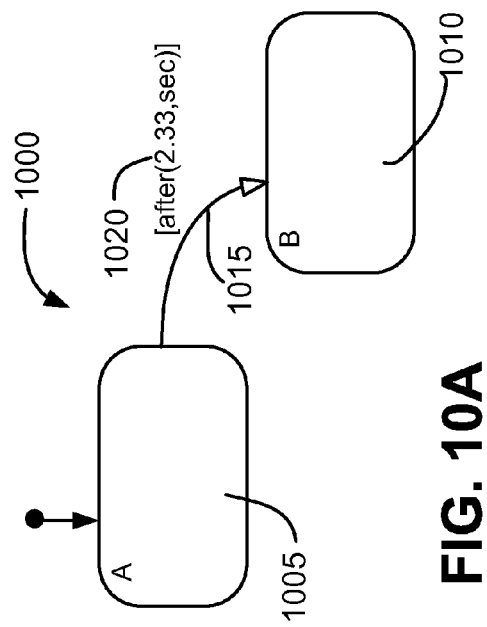

In order to implement the above absolute time condition, state diagram 1000 of FIG. 10A may be translated into state diagram 1025 of FIG. 10B. As shown, element 1005 of state diagram 1025 now includes an entry action 1030 of "$t_0=t$" and condition statement 1020 has been replaced with the condition statement 1035 of $[t-t_0>=2.33]$. The translation to state diagram 1025 of FIG. 10B retrieves the simulation time t at the time state A is awoken and sets this value to $t_0$. The system them continually examines the simulation time t relative to the value of $t_0$ and transitions from state A to state B when the difference between t and $t_0$ meets or exceeds 2.33 seconds.

By supporting absolute time dynamics in continuous time simulation models, precise mode transitions may be identified and used.

CONCLUSION

State diagram model formulations described herein may provide for increased accuracy and simplicity when modeling and simulating continuous time, mode-driven systems.

The foregoing description of implementations provides illustration and description, but is not intended to be exhaustive or to limit the invention to the precise form disclosed. Modifications and variations are possible in light of the above teachings or may be acquired from practice of the invention.

For example, while a series of acts has been described with regard to FIGS. 4 and 8, the order of the acts may be modified in other implementations. Further, non-dependent acts may be performed in parallel.

Also, the term "user" has been used herein. The term "user" is intended to be broadly interpreted to include a workstation or a user of a workstation.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that one would be able to design software and control hardware to implement the embodiments based on the description herein.

Further, certain portions of the invention may be implemented as "logic" that performs one or more functions. This logic may include hardware, such as an application specific integrated circuit or a field programmable gate array, software, or a combination of hardware and software.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    generating a control flow graph corresponding to a state of a state diagram model,
        the state diagram model corresponding to a model that is continuously updated,
        the state being associated with a condition;
    evaluating the condition;
    determining an output of the control flow graph based on a value corresponding to a result of evaluating the condition;
    identifying a likelihood of an occurrence of a transition, of the control flow graph, associated with the condition;
    determining whether to re-evaluate the condition based on a value corresponding to the likelihood of the occurrence of the transition; and
    determining another output of the control flow graph based on a value corresponding to a result of re-evaluating the condition when the condition is re-evaluated,
    the generating the control flow graph, the evaluating the condition, the determining the output of the control flow graph, the identifying the likelihood of the occurrence of the transition, the determining whether to re-evaluate the condition, and the determining the other output of the control flow graph being performed by a computing device.

2. The method of claim 1, further comprising:
    generating a first data structure; and
    storing, in the first data structure, the value corresponding to the result of evaluating the condition.

3. The method of claim 2, further comprising:
    re-evaluating the condition, based on the value corresponding to the likelihood of the occurrence of the transition, to obtain the value corresponding to the result of re-evaluating the condition; and
    storing, in the first data structure, the value corresponding to the result of re-evaluating the condition.

4. The method of claim 1, further comprising:
    generating a first data structure; and
    storing, in the first data structure, the value corresponding to the likelihood of the occurrence of the transition.

5. The method of claim 4, further comprising:
    retrieving, from the first data structure, the value corresponding to the likelihood of the occurrence of the transition,
        where determining whether to re-evaluate the condition includes determining whether to re-evaluate the condition based on the retrieved value corresponding to the likelihood of the occurrence of the transition.

6. The method of claim 1, further comprising:
    generating the state diagram model prior to generating the control flow graph; and
    receiving an input indicating that the state diagram model is a model that is continuously updated.

7. The method of claim 6, further comprising:
    receiving an input indicating that transition detection is enabled for the state diagram model,
    where identifying the likelihood of the occurrence of the transition includes identifying the likelihood of the occurrence of the transition based on the input indicating that transition detection is enabled.

8. The method of claim 1, further comprising:
    generating a function associated with the state diagram model,
    where evaluating the condition includes evaluating the condition using the function.

9. The method of claim 1, further comprising:
generating a function associated with the state diagram model,
where identifying the likelihood of the occurrence of the transition includes identifying the likelihood of the occurrence of the transition using the function.

10. A non-transitory computer-readable medium storing instructions, the instructions comprising:
one or more instructions which, when executed by a computing device, cause the computing device to obtain a control flow graph corresponding to a state of a state diagram model,
the state diagram model corresponding to a model that is continuously updated,
the state being associated with a condition;
one or more instructions which, when executed by the computing device, cause the computing device to evaluate the condition;
one or more instructions which, when executed by the computing device, cause the computing device to determine an output of the control flow graph based on a value corresponding to a result of evaluating the condition;
one or more instructions which, when executed by the computing device, cause the computing device to identify a likelihood of an occurrence of a transition, of the control flow graph, associated with the condition;
one or more instructions which, when executed by the computing device, cause the computing device to determine whether to re-evaluate the condition based on a value corresponding to the likelihood of the occurrence of the transition; and
one or more instructions which, when executed by the computing device, cause the computing device to determine another output of the control flow graph based on a value corresponding to a result of re-evaluating the condition when the condition is re-evaluated.

11. The non-transitory computer-readable medium of claim 10, the instructions further comprising:
one or more instructions to generate a function associated with the state diagram model,
where the one or more instructions to evaluate the condition include:
one or more instructions to execute the function to evaluate the condition.

12. The non-transitory computer-readable medium of claim 10, the instructions further comprising:
one or more instructions to generate a function associated with the state diagram model,
where the one or more instructions to identify the likelihood of the occurrence of the transition include:
one or more instructions to execute the function to identify the likelihood of the occurrence of the transition.

13. The non-transitory computer-readable medium of claim 10, the instructions further comprising:
one or more instructions to generate the state diagram model prior to obtaining the control flow graph; and
one or more instructions to receive an input indicating that the state diagram model is a model that is continuously updated.

14. The non-transitory computer-readable medium of claim 13, the instructions further comprising:
one or more instructions to receive an input indicating that transition detection is enabled for the state diagram model,
where the likelihood of the occurrence of the transition is identified based on the input indicating that transition detection is enabled.

15. The non-transitory computer-readable medium of claim 10, the instructions further comprising:
one or more instructions to generate a first data structure;
one or more instructions to store, in the first data structure, the value corresponding to the result of evaluating the condition;
one or more instructions to generate a second data structure; and
one or more instructions to store, in the second data structure, the value corresponding to the likelihood of the occurrence of the transition.

16. The non-transitory computer-readable medium of claim 15, the instructions further comprising:
one or more instructions to retrieve, from the second data structure, the value corresponding to the likelihood of the occurrence of the transition;
one or more instructions to re-evaluate the condition, based on the retrieved value corresponding to the likelihood of the occurrence of the transition, to obtain the value corresponding to the result of re-evaluating the condition; and
one or more instructions to store, in the first data structure, the value corresponding to the result of re-evaluating the condition.

17. A non-transitory computer-readable medium storing instructions, the instructions comprising:
one or more instructions which, when executed by a computing device, cause the computing device to obtain a state diagram model that includes:
a first state,
a second state, and
a transition between the first state and the second state, the transition including a condition,
the condition identifying a duration of time relating to a simulation of the state diagram model;
one or more instructions which, when executed by the computing device, cause the computing device to translate the condition into another condition,
the other condition identifying a first time and a second time relating to the simulation of the state diagram model; and
one or more instructions which, when executed by the computing device, cause the computing device to cause the state diagram model to be simulated, after translating the condition to the other condition, to obtain one or more results.

18. The non-transition computer-readable medium of claim 17, where the one or more instructions to translate the condition into another condition include:
one or more instructions to insert, into the first state, information identifying an initial time, relating to the first state, associated with the simulation of the state diagram model,
the initial time corresponding to the first time; and
one or more instructions which, when executed by the computing device, cause the computing device to convert the condition into the other condition using the first time and the second time.

19. The non-transition computer-readable medium of claim 17, the instructions further comprising:
one or more instructions to continuously monitor the simulation of the state diagram model relative to the first time; and
one or more instructions to cause a transition from the first state to the second state to occur when the duration of time has passed since the first time.

20. The non-transition computer-readable medium of claim 17, where the state diagram model corresponds to a continuous time state diagram model.

\* \* \* \* \*